United States Patent
Jung

(10) Patent No.: US 9,831,651 B2
(45) Date of Patent: Nov. 28, 2017

(54) CABLE FASTENING DEVICE

(71) Applicant: Ford Global Technologies, LLC, Dearborn, MI (US)

(72) Inventor: Markus Jung, Nordrhein-Westfalen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/185,836

(22) Filed: Jun. 17, 2016

(65) Prior Publication Data

US 2016/0372908 A1    Dec. 22, 2016

(30) Foreign Application Priority Data

Jun. 18, 2015 (DE) .................. 10 2015 211 271

(51) Int. Cl.
*H02G 3/22* (2006.01)
*H02G 3/32* (2006.01)
*B60R 16/02* (2006.01)
*H02G 3/04* (2006.01)

(52) U.S. Cl.
CPC .......... *H02G 3/32* (2013.01); *B60R 16/0215* (2013.01); *H02G 3/0406* (2013.01); *H02G 3/22* (2013.01)

(58) Field of Classification Search
CPC .......... H02G 3/22; H02G 3/32; H02G 3/0406; F16L 3/00; B60R 16/0215
USPC ....................................................... 174/135
See application file for complete search history.

(56) References Cited

U.S. PATENT DOCUMENTS

| 4,436,265 A * | 3/1984 | Simon ............... H02G 3/0658 174/153 G |
| 6,010,134 A * | 1/2000 | Katoh ............... B60R 16/0222 174/152 G |
| 8,963,010 B2 | 2/2015 | Sprenger et al. |
| 2004/0121637 A1 | 6/2004 | Beege et al. |

FOREIGN PATENT DOCUMENTS

| DE | 9421751 U1 | 7/1996 |
| DE | 29704887 U1 | 5/1997 |
| EP | 2600475 A2 | 5/2013 |

* cited by examiner

*Primary Examiner* — Dhirubhai R Patel
(74) *Attorney, Agent, or Firm* — Burgess Law Office, PLLC; Raymond L. Coppiellie

(57) ABSTRACT

A fastening device for a cable is operatively connected to a motor vehicle. The fastening device includes a holder fixedly secured to the motor vehicle. The holder defines a receiving opening with a stop extending out along a side of the receiving opening. A cable feedthrough grommet surrounds a portion of the cable in a cable longitudinal direction. The cable feedthrough grommet includes a radial thickening and defines a groove extending through the radial thickening. The groove is received by the receiving opening of the holder to hold the cable feedthrough grommet in place. The cable feedthrough grommet includes a protuberance that extends radially out from the radial thickening to engage the stop of the holder to prevent the cable feedthrough grommet from being secured to the holder in a misaligned manner.

12 Claims, 5 Drawing Sheets

CABLE FASTENING DEVICE

CROSS-REFERENCE TO RELATED APPLICATIONS

Not Applicable.

BACKGROUND OF THE INVENTION

1. Field of the Invention

The invention relates to a fastening device for a cable; and, more specifically, to a fastening device for an electrical cable in a motor vehicle.

2. Description of Related Art

Fastening devices for cables, in particular for electrical cables in a motor vehicle, are known. In general, such devices include a cable feedthrough grommet made of resiliently deformable material, with the grommet fixed to a holder. The cable feedthrough grommet surrounds the cable in the cable longitudinal direction at least in part and has a radial thickening, in which a groove is formed, by means of which the cable feed through grommet is releasably fastened in a receiving opening of the holder.

The cable feedthrough grommet of fastening devices of this type have no fixedly predefined assembly direction, at least regarding the cable's longitudinal direction. The cable feedthrough grommet can be fastened to the holder both in a first cable longitudinal direction and in an orientation rotated 180 degrees thereto. For example, an ABS wheel sensor moves relative to a vehicle body because the ABS sensor is arranged on a wheel suspension. In these types of instances, it is essential that a cable anti-kink device of the cable feed through grommet points, from the holder connected for example to the static vehicle body, toward the dynamic wheel suspension side, and that the cable feedthrough grommet accordingly has a preferred direction of installation relative to the holder.

SUMMARY OF THE INVENTION

A fastening device for a cable is operatively connected to a motor vehicle. The fastening device includes a holder fixedly secured to the motor vehicle. The holder defines a receiving opening with a stop extending out along a side of the receiving opening. A cable feedthrough grommet surrounds a portion of the cable in a cable longitudinal direction. The cable feedthrough grommet includes a radial thickening and defines a groove extending through the radial thickening. The groove is received by the receiving opening of the holder to hold the cable feedthrough grommet in place. The cable feedthrough grommet includes a protuberance that extends radially out from the radial thickening to engage the stop of the holder to prevent the cable feedthrough grommet from being secured to the holder in a misaligned manner.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
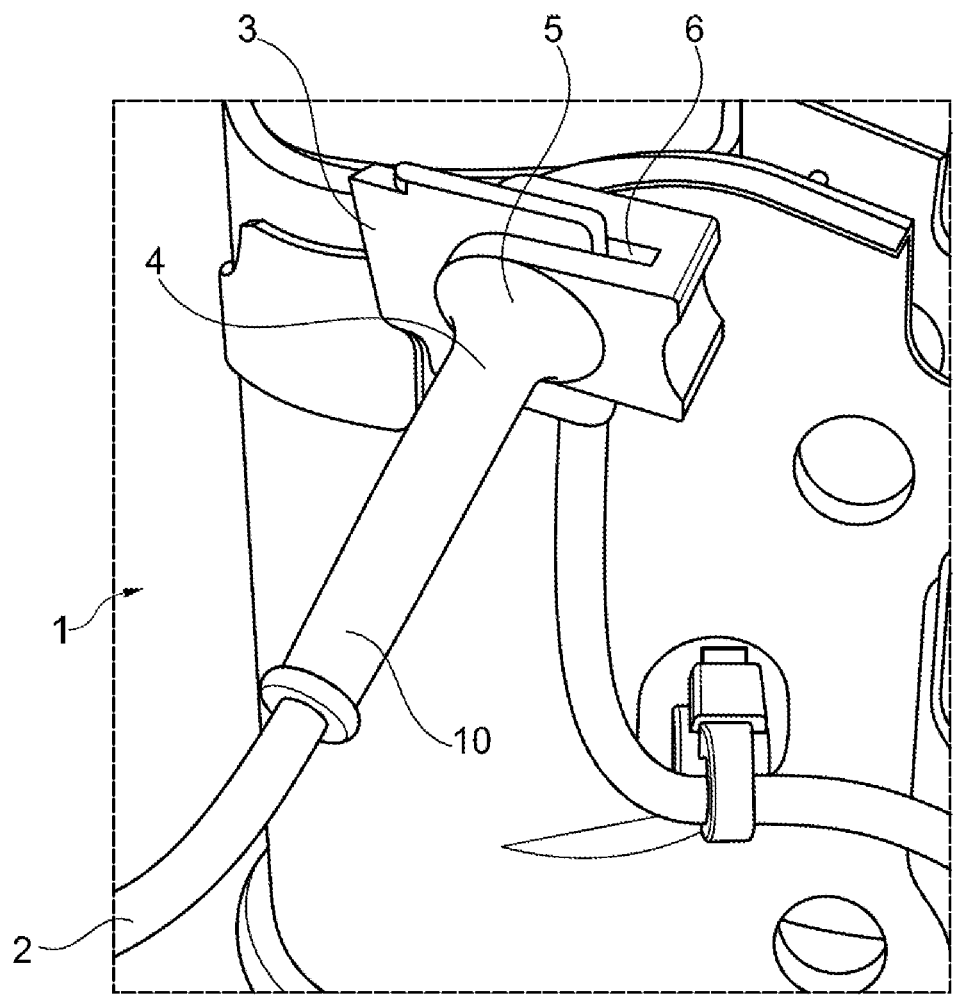
FIG. 1 is a perspective view of a mounted fastening device according to the prior art.

The following description of the preferred embodiments is merely exemplary in nature and is in no way intended to limit the invention, its application, or uses. Elements that are equivalent in terms of their function are always provided with the same reference numeral in the different figures, such that these are generally described only once.

Referring to FIG. 1, a perspective view of a prior art assembly is shown. A fastening device 1 for a cable 2 is shown in a mounted state. The fastening device 1 includes a holder 3, to which a cable feedthrough grommet 4, made of resiliently deformable material to guide the cable 2, is fixed. As seen in FIG. 1, the cable feedthrough grommet 4 surrounds the cable 2 in portions in the longitudinal direction. The cable feedthrough grommet 4 also has a radial thickening 5, in which a groove 6 is formed. The cable feedthrough grommet 4 is releasably fastened with the groove 6 in a receiving opening 7 of the holder 3, which opening can be seen in FIG. 2.

Figure 2:
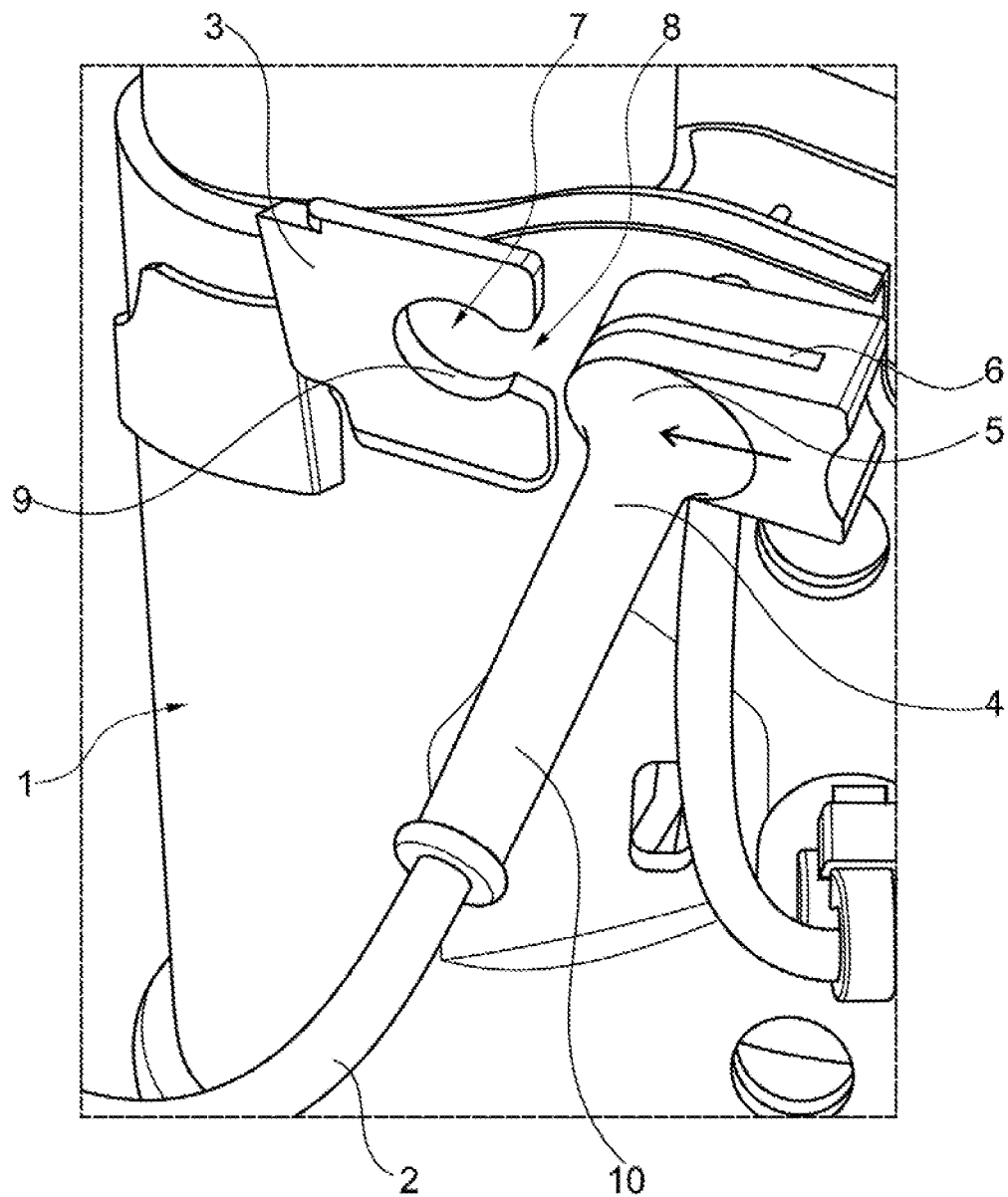
FIG. 2 is a perspective view of the prior art fastening device of FIG. 1 in a disassembled state.

FIG. 2 shows the fastening device 1 from FIG. 1 in a disassembled state, in which the cable feedthrough grommet 4 is released from the holder 3. It can be seen that the cable feedthrough grommet 4 can be inserted in the receiving opening 7 laterally through an aperture 8 formed in the holder 3. A peripheral wall 9 surrounds the receiving opening 7 of the holder and engages with the groove 6 of the cable feedthrough grommet 4.

The fastening device 1, according to the prior art illustrated in FIGS. 1 and 2, allows securing the cable feedthrough grommet 4 to the holder 3 both in the orientation in FIGS. 1 and 2 and in the opposition direction (not illustrated). The cable feedthrough grommet 4 can be connected to the holder in an orientation rotated substantially through 180 degrees about an axis transversely to the cable longitudinal direction defined by the cable feedthrough grommet 4. If so, a cable anti-kink device 10 formed for example on the cable feedthrough grommet 4 would extend precisely in the direction opposite the direction in FIGS. 1 and 2 and could therefore no longer provide its protective effect necessary in the portion of the cable 2 on the dynamic side of the cable 2 (the side moving frequently). In addition, the extension alone of the cable 2 incorrectly rotated through 180 degrees could lead to an increased stress in the cable and/or to contact between the cable 2 and other components, which may lead to premature failure.

Figure 3:
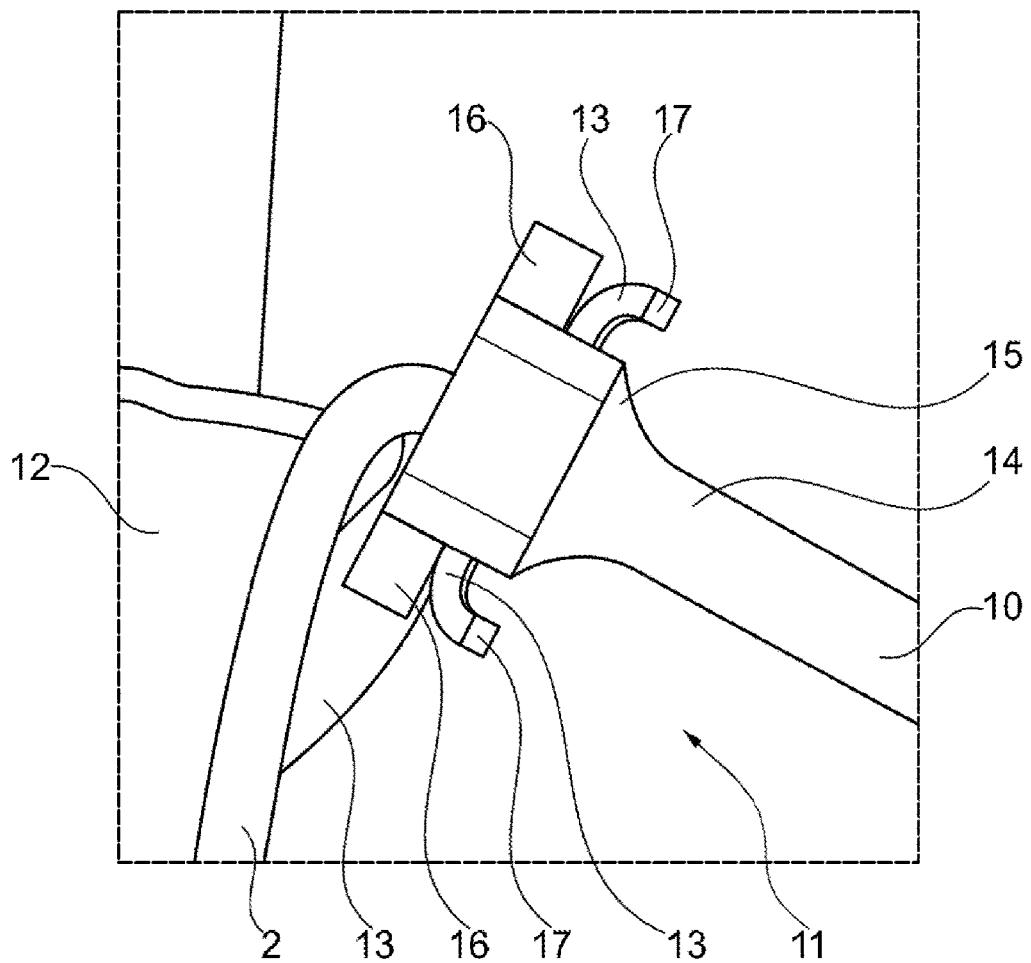
FIG. 3 is a schematic drawing of one embodiment of the invention in a mounted state.

FIG. 3 illustrates a side view of an example of a preferred embodiment of a fastening device 11 for a cable 2 is shown in a mounted state. The cable 2 is an electrical cable for an electrical connection from a motor vehicle, graphically represented by a vehicle body 12, to an ABS wheel sensor (not shown), which is arranged on the wheel suspension and moving with respect to the vehicle body 12. The fastener device 11 includes a cable feedthrough grommet 14, which can be fixed to a holder 13. The cable feedthrough grommet 14 is made of a resiliently deformable material. The cable feedthrough grommet 14 surrounds the cable 2 in part in the cable longitudinal direction and has a radial thickening 15, in which, similarly to the previously described fastening device 1, a groove 23 is formed, by means of which the cable feedthrough grommet 14 is releasably secured in a receiving opening (best seen in FIG. 5) of the holder 13. In this embodiment, the groove 23 does not run around the radial thickening 15 over the entire periphery, and therefore a rotation of the cable feedthrough grommet 14 about its longitudinal axis is prevented in the holder 13. The cable feedthrough grommet 14 also includes a cable anti-kink device 10, which is formed as an elongated hollow body extending in the cable longitudinal direction and surrounding the cable 2.

The right half of FIG. 3 is referred to as the dynamic side of the fastening device 11, and the left half of FIG. 3 is the static side. The dynamic side of the fastening device 11 moves relative to the static side (vehicle body 12) during the operation of the motor vehicle because the ABS wheel sensor is arranged on the dynamic side, as already mentioned, on the wheel suspension, for example on a wheel mount (not shown). It is the ABS wheel sensor that is electrically connected to an electronic control device (not shown) on the static side (vehicle body 12) vis-à-vis the cable 2, which is secured using the fastening device 11. The cable anti-kink device 10 protects the cable 2 on the dynamic side against damage, e.g., breakage, caused by frequent cable movements.

The cable feedthrough grommet 14 has two protuberances 16 protruding in the radial direction. The protuberances 16 are formed in the exemplary embodiment of the fastening device 11 illustrated in FIG. 3 of the radial thickening 15. The holder 13 has, on the opposite axial side of the groove 23 or on an axial side of the receiving opening (not shown), which faces toward the dynamic side, two stops 17 formed on the holder 13. As seen in FIG. 3, the protuberances 16 of the cable feedthrough grommet 14 and the stops 17 of the holder 13 are arranged adjacently as illustrated in FIG. 3 of a correct mounting orientation of the cable feedthrough grommet 14 on the holder 13. As shown, the protuberances 16 and the stops 17 do not interfere with or block one another when the cable feedthrough grommet 14 is inserted into the receiving opening of the holder 13; therefore, a fastening of the cable feedthrough grommet 14 to the holder 13 is possible in the manner known.

In an orientation of the cable feedthrough grommet 14 rotated substantially through 180 degrees compared with the illustration in FIG. 3 (blocking orientation, not shown) the protuberances 16 of the cable feedthrough grommet 14 and the stops 17 of the holder 13 would be arranged opposite one another. This arrangement blocks and inhibits insertion of the cable feedthrough grommet 14 into the receiving opening of the holder 13. The blocking orientation of the cable feedthrough grommet 14 is provided when the cable feedthrough grommet 14 is rotated substantially through 180 degrees about an axis arranged perpendicularly to the image plane of FIG. 3.

As shown in the side view of the fastening device 11, the holder 13 has a substantially U-shaped cross section with a flat base side and two adjoining legs extending substantially parallel to one another, which legs form the stops 17. The receiving opening of the holder 13 is arranged in the flat base side of the U-profile.

Figure 4:
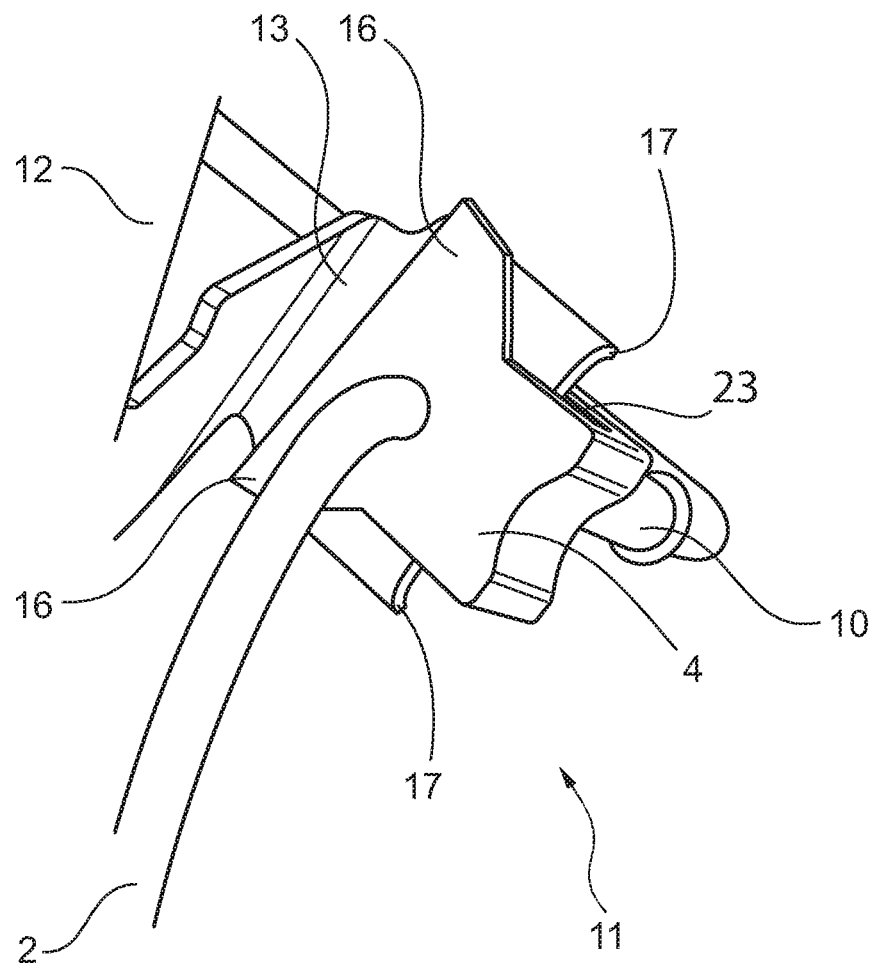
FIG. 4 is a schematic drawing of a perspective view of the fastening device of FIG. 3.

FIG. 4 illustrates a perspective view of the fastening device 11 of FIG. 3. In this view, the two protuberances 16 of the cable feedthrough grommet 14 of the exemplary fastening device 11 can be clearly seen.

Figure 5:
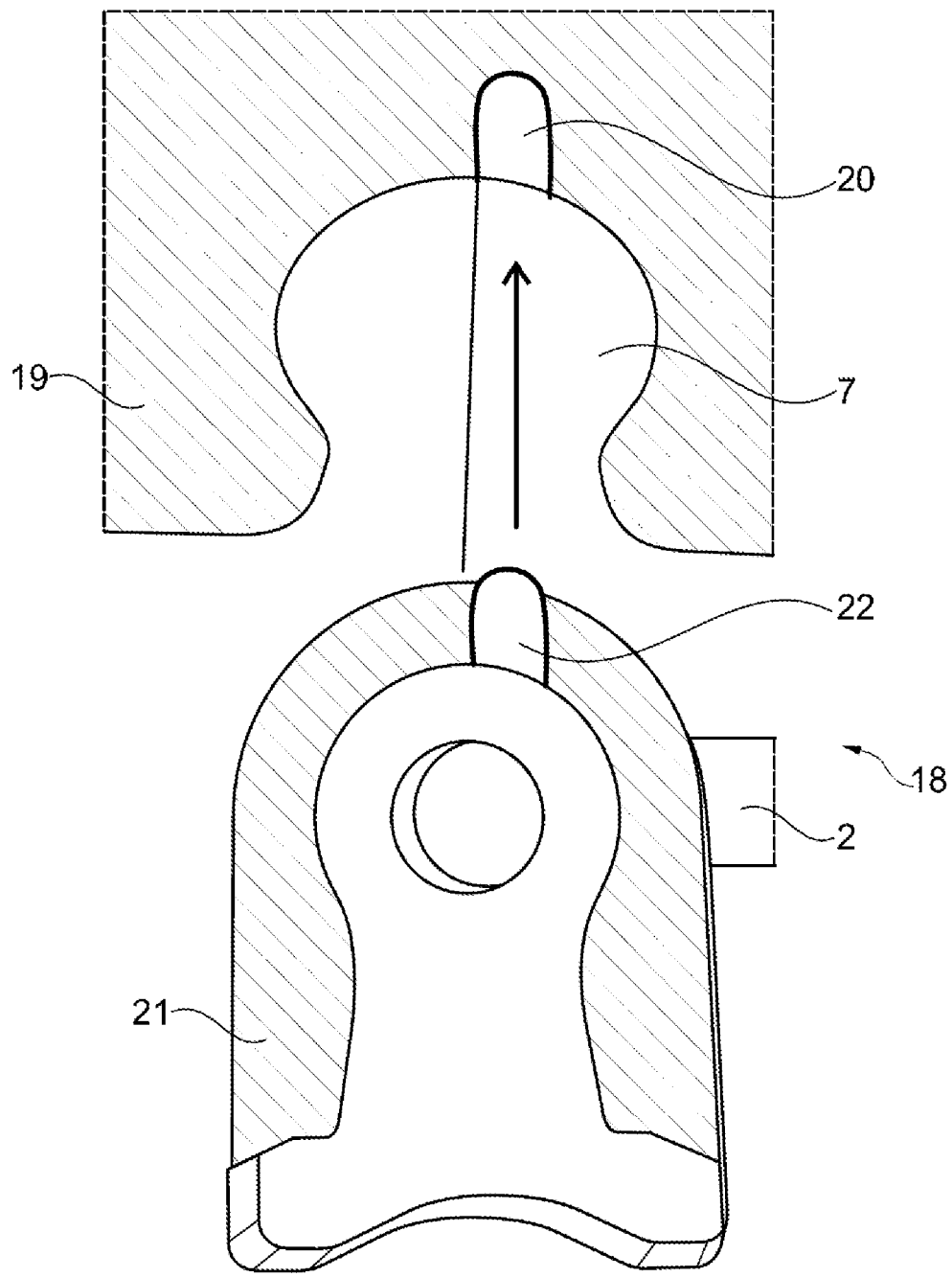
FIG. 5 is an exploded plan, sectional view of a second exemplary embodiment of a fastening device according to the invention.

A partial view of a second exemplary embodiment of a fastening device 18 is shown in FIG. 5. In the upper half of FIG. 5, a holder 19 shows the receiving opening 7. The receiving opening 7 includes a recess 20. A corresponding pin 22 formed on a cable feedthrough grommet 21 engages the recess 20 when the cable feedthrough grommet 21 is introduced at the receiving opening 7 of the holder 19. The pin 22 and recess 20 can be a form of mechanical coding. This embodiment facilitates the desired mounting orientation between the holder 19 and the cable feedthrough grommet 21. With a rotation of the cable feedthrough grommet 21 through 180 degrees transversely to the cable longitudinal direction defined by the cable feedthrough grommet 21, the pin 22 can no longer engage with the recess 20 and prevents the insertion of the cable feedthrough grommet 21 into the receiving opening 7 of the holder 19 (blocking orientation).

The fastening device according to the invention described above is not limited to the embodiments disclosed, but also include similarly acting further embodiments. In particular, the fastening device is not limited to the number of protuberances and/or stops and/or pins and/or recesses described in the exemplary embodiments described. For example, it is conceivable for just one protuberance to be provided on the cable feedthrough grommet, with the protuberance cooperating with a stop formed on the holder. Likewise, more than two protuberances and more than two stops are conceivable.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fastening device for a cable operatively connected to a motor vehicle, said fastening device comprising:
   a holder fixedly secured to the motor vehicle, said holder defining a receiving opening with a stop extending out along a side of said receiving opening; and
   a cable feedthrough grommet surrounding a portion of the cable in a cable longitudinal direction, said cable feedthrough grommet including a radial thickening and defining a groove extending through said radial thickening such that said groove of said cable feedthrough grommet is received by said receiving opening of said holder to hold said cable feedthrough grommet in place, said cable feedthrough grommet including a protuberance extending radially out from said radial thickening to engage said stop of said holder to prevent said cable feedthrough grommet from being secured to said holder in a misaligned manner.

2. A fastener device as set forth in claim 1 wherein said cable feedthrough grommet is fabricated of a resiliently deformable material.

3. A fastener device as set forth in claim 2 where said holder has a substantially U-shaped cross section with a flat base side and two adjoining legs extending substantially parallel to each other such that said receiving opening is arranged in said flat base side and said legs form said stop.

4. A fastening device as set forth in claim 3 wherein said cable feedthrough grommet includes a cable anti-kink device extending out from said radial thickening.

5. A fastening device as set forth in claim 4 wherein said anti-kink device is formed as an elongated hollow body extending in the cable longitudinal direction and surrounds the portion of the cable.

6. A fastener device as set forth in claim 5 wherein said groove runs along a portion of said radial thickening.

7. A fastening device for a cable operatively connected to a motor vehicle, said fastening device comprising:
- a holder fixedly secured to the motor vehicle, said holder defining a receiving opening with a stop extending out along a side of said receiving opening, said holder further including a recess extending into said holder from said receiving opening; and
- a cable feedthrough grommet surrounding a portion of the cable in a cable longitudinal direction, said cable feedthrough grommet including a radial thickening and defining a groove extending through said radial thickening such that said groove of said cable feedthrough grommet is received by said receiving opening of said holder to hold said cable feedthrough grommet in place, said cable feedthrough grommet including a protuberance extending radially out from said radial thickening to engage said stop of said holder to prevent said cable feedthrough grommet from being secured to said holder in a misaligned manner, said cable feedthrough grommet further including a pin extending out from said groove in said radial thickening to be received by said recess in said holder.

8. A fastener device as set forth in claim 7 wherein said cable feedthrough grommet is fabricated of a resiliently deformable material.

9. A fastener device as set forth in claim 8 where said holder has a substantially U-shaped cross section with a flat base side and two adjoining legs extending substantially parallel to each other such that said receiving opening is arranged in said flat base side and said legs form said stop.

10. A fastening device as set forth in claim 9 wherein said cable feedthrough grommet includes a cable anti-kink device extending out from said radial thickening.

11. A fastening device as set forth in claim 10 wherein said anti-kink device is formed as an elongated hollow body extending in the cable longitudinal direction and surrounds the portion of the cable.

12. A fastener device as set forth in claim 11 wherein said groove runs along a portion of said radial thickening.

* * * * *